US009047550B2

(12) United States Patent
Shinyama

(10) Patent No.: US 9,047,550 B2
(45) Date of Patent: Jun. 2, 2015

(54) IMAGE FORMATION APPARATUS CONFIGURED TO DETECT AND CORRECT DETECTED LIGHT REFLECTION CHARACTERISTICS

(71) Applicant: Oki Data Corporation, Tokyo (JP)

(72) Inventor: Hideki Shinyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/333,863

(22) Filed: Jul. 17, 2014

(65) Prior Publication Data

US 2015/0022836 A1 Jan. 22, 2015

(30) Foreign Application Priority Data

Jul. 19, 2013 (JP) ................................ 2013-150192

(51) Int. Cl.
*G06K 15/00* (2006.01)
*G06K 15/16* (2006.01)

(52) U.S. Cl.
CPC .................................... *G06K 15/16* (2013.01)

(58) Field of Classification Search
USPC ................................................ 358/1.1–3.29
See application file for complete search history.

(56) References Cited

U.S. PATENT DOCUMENTS

2008/0025742 A1* 1/2008 Kato et al. ...................... 399/49
2008/0145089 A1* 6/2008 Takahashi ....................... 399/74
2010/0238465 A1* 9/2010 Kageyama et al. ............ 358/1.9

FOREIGN PATENT DOCUMENTS

JP 2011-197417 A 10/2011

OTHER PUBLICATIONS

JP Publication No. 2011-197417, Abstract, (Cited in IDS), Niyama Hideo, Jun. 6, 2011, Image Forming Apparatus.*

* cited by examiner

*Primary Examiner* — Marcellus Augustin
(74) *Attorney, Agent, or Firm* — Marvin A. Motsenbocker; MOTS LAW, PLLC

(57) ABSTRACT

An image formation apparatus includes a conveyance member in which a reflection characteristics irregular part having light reflection characteristics different from those of a surrounding surface part is formed, a measurement unit configured to perform an detection operation including irradiating the conveyance member with irradiation light and detecting reflection light, a controller configured to perform a current detection operation, and perform a next detection operation after a surface of the conveyance member is moved by a distance longer than a reflection characteristics irregular part length that is a length of the reflection characteristics irregular part in a movement direction of the conveyance member surface, and a correction unit configured to perform correction for image formation on the basis of detection results of the current detection operation and the next detection operation by the measurement unit.

18 Claims, 16 Drawing Sheets

CONFIGURATION OF DENSITY SENSOR

INNER STRUCTURE OF COLOR PRINTER

STRUCTURE OF COAT LAYER

STATE WHERE COAT LAYER IS FORMED

CIRCUIT CONFIGURATION OF COLOR PRINTER

CONFIGURATION OF DENSITY SENSOR

STATE OF REFLECTION LIGHT FROM COAT LAYER

SPECULAR REFLECTION LIGHT QUANTITY VALUE MEASUREMENT POSITIONS IN CALIBRATION (1)

SPECULAR REFLECTION LIGHT QUANTITY VALUE MEASUREMENT POSITIONS IN CALIBRATION (2)

CALIBRATION PROCESSING PROCEDURE

Fig.10

| | MEASUREMENT RESULT OF SPECULAR REFLECTION LIGHT QUANTITY VALUES | | | |
|---|---|---|---|---|
| | PATTERN 1 | PATTERN 2 | PATTERN 3 | PATTERN 4 |
| FIRST TIME | MAX | MAX | MAX | MAX |
| SECOND TIME | MIN | MAX | MIN | MAX |
| THIRD TIME | MID | MIN | MIN | MAX |

DETECTION RESULT BY SPECULAR REFLECTION MEASUREMENT SENSOR

CONFIGURATION OF PATCH PATTERN

PATCH PATTERN PRINTING PROCESSING PROCEDURE

SPECULAR REFLECTION LIGHT QUANTITY VALUE
MEASUREMENT POSITIONS IN DENSITY CORRECTION (1)

SPECULAR REFLECTION LIGHT QUANTITY VALUE
MEASUREMENT POSITIONS IN DENSITY CORRECTION (2)

TIMING OF DENSITY MEASUREMENT OF PATCH PATTERN

PATCH PATTERN SENSING PROCESSING PROCEDURE

IMAGE FORMATION APPARATUS CONFIGURED TO DETECT AND CORRECT DETECTED LIGHT REFLECTION CHARACTERISTICS

CROSS REFERENCE TO RELATED APPLICATIONS

This application claims priority based on 35 USC 119 from prior Japanese Patent Application No. 2013-150192 filed on Jul. 19, 2013, entitled "IMAGE FORMATION APPARATUS", the entire contents of which are incorporated herein by reference.

BACKGROUND OF THE INVENTION

1. Field of the Invention

The disclosure relates to an image formation apparatus, and is preferably applied to an image formation apparatus of what is called a tandem system in which image formation units are disposed side by side in series in a conveyance direction of recording paper, for example.

2. Description of Related Art

Conventionally, some image formation apparatuses form a color image in such a way that image formation units of respective colors transfer images of the respective colors in a superimposed manner onto recording paper on a conveyance belt while the recording paper is conveyed successively to the image formation units of the respective colors. Some of such image formation apparatuses are configured to correct image formation conditions upon the occurrence of an event where the print density may vary, such as an event where a predetermined number of sheets of recording paper are to be printed. The images are thus stably formed by correcting the density of the images to be formed (for example, refer to Japanese Laid-open Patent Publication No. 2011-197417).

In the density correction, the image formation apparatus performs a calibration that involves: irradiating the conveyance belt with irradiation light; sensing the reflection light reflected from the conveyance belt; and adjusting the intensity of the irradiation light such that the light quantity of the reflection light can become a preset value. Then, the image formation apparatus prints a patch pattern for density correction on the conveyance belt, irradiates the patch pattern with irradiation light to sense the reflection light, detects the density of the patch pattern, and corrects the image formation conditions on the basis of the density. Such density correction is performed on the precondition that light reflection characteristics on the surface of the conveyance belt are almost uniform at any part in the conveyance belt.

SUMMARY OF THE INVENTION

However, in some cases, the surface of the conveyance belt has a part different in light reflection characteristics from the surface of a surrounding part. If such a part is irradiated with irradiation light, a good image may fail to be formed because the density correction cannot be performed with high accuracy due to the inappropriate intensity of the reflection light.

An embodiment of the invention aims to propose an image formation apparatus capable of forming a good image.

An aspect of the invention is an image formation apparatus that includes: a conveyance member in which a reflection characteristics irregular part is formed having light reflection characteristics different from those of a surrounding surface part; a measurement unit configured to perform a detection operation including irradiating the conveyance member with irradiation light and detecting reflection light; a controller configured to perform a current detection operation, and perform a next detection operation after a surface of the conveyance member is moved by a distance longer than a reflection characteristics irregular part length that is a length of the reflection characteristics irregular part in a movement direction of the conveyance member surface; and a correction unit configured to perform a correction for image formation on the basis of the detection results of the current detection operation and the next detection operation by the measurement unit.

According to the above aspect, the correction can be made while avoiding the influence by the light reflection characteristics in the reflection characteristics irregular part that is different from other surfaces. Thus, an image formation apparatus can be obtained that is capable of forming a good image.

BRIEF DESCRIPTION OF THE DRAWINGS

FIG. 10 is a table illustrating a detection result by a specular reflection measurement sensor;

DETAILED DESCRIPTION OF EMBODIMENTS

Figure 1:
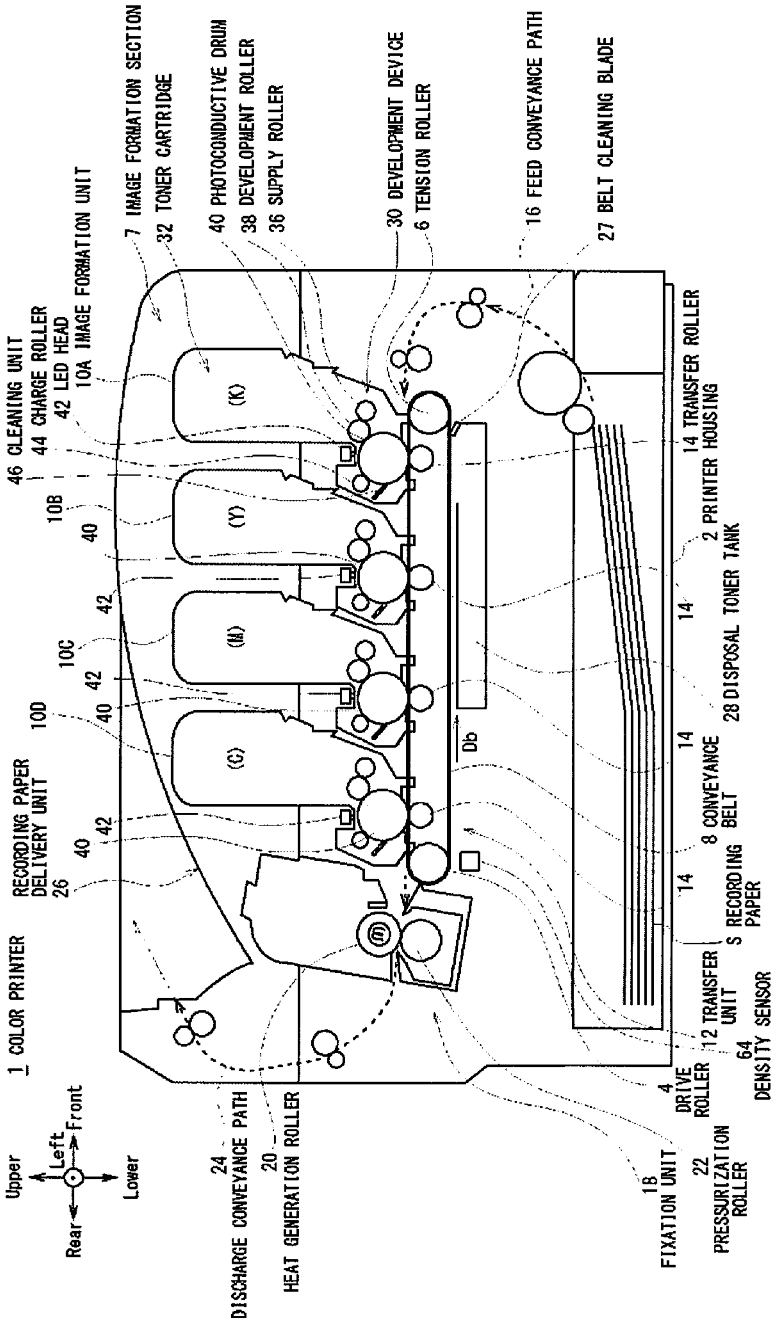
FIG. 1 is a schematic diagram illustrating an inner structure of a color printer.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Hereinafter, embodiments are described using the drawings.

1. Embodiment 1-1. Inner Structure of Color Printer

As illustrated in FIG. 1, color printer 1 employs what is called a direct tandem system, and includes printer housing 2 of an approximate box type. The following explanation of color printer 1 and image formation units 10 is made with sides of color printer 1 defined such that the front side is a side which a user in front of printer housing 2 faces, the rear side is an opposite side to the front side, and the left and right sides and the upper and lower sides are the left and right and the upper and lower sides viewed from the user who faces the front side.

In printer housing 2, image formation section 7 is provided for forming a print image by printing a color image of a printing target on a surface of recording paper S. Image formation section 7 includes four image formation units 10 (10A to 10D) that develop electrostatic latent images using respective toners to form toner images, the electrostatic latent images indicating cyan (C), magenta (M), yellow (Y), and black (K) that are different color components of the print image. In this case, four image formation units 10A to 10D are configured in the same manner except that toners of different colors are used for the development of the electrostatic latent images, and are removably installed in an upper end portion in printer housing 2 by being sequentially arranged from the front to the rear. In forming a print image, image formation units 10A to 10D expose light on the surfaces of photoconductive drums 40 by light emitting diode (LED) heads 42 while rotating photoconductive drums 40 to form electrostatic latent images indicating predetermined color components of the print image, and develop the electrostatic latent images using the respective toners to form toner images.

Further, transfer unit 12 is disposed from below an area ranging from image formation unit 10A to image formation unit 10D in image formation section 7. Transfer unit 12 transfers the toner images formed by image formation units 10A to 10D onto the surface of recording paper S. Transfer unit 12 is provided with rotatable drive roller 4 below in the obliquely rear direction of image formation unit 10D and rotatable tension roller 6 below image formation unit 10A. Density sensor 64 is provided below drive roller 4. Density sensor 64 irradiates conveyance belt 8 with irradiation light, and measures reflection light thus reflected to acquire a measurement result used for calibration processing and density correction processing, the details of which are described later. Further, endless conveyance belt 8 that electrostatically adsorbs and conveys recording paper S for transferring toner images thereon is stretched around drive roller 4 and tension roller 6 in transfer unit 12. Conveyance belt 8 is conveyed in belt forward direction Db with the rotational driving force of drive roller 4. Conveyance belt 8 includes coat layer 34 formed on the surface of belt part 33, over the entire outer peripheral surface of conveyance belt 8, as illustrated in a partially enlarged view in FIG. 2. For belt part 33, a material film in which carbon is dispersed is used in order to obtain electric characteristics for transferring toner. Accordingly, conveyance belt 8 has such characteristics that a surface thereof is black, so that the surface absorbs infrared light and generates a less diffused reflection, but is finished in a high gloss level, so that the surface generates much specular reflection.

Figure 2:
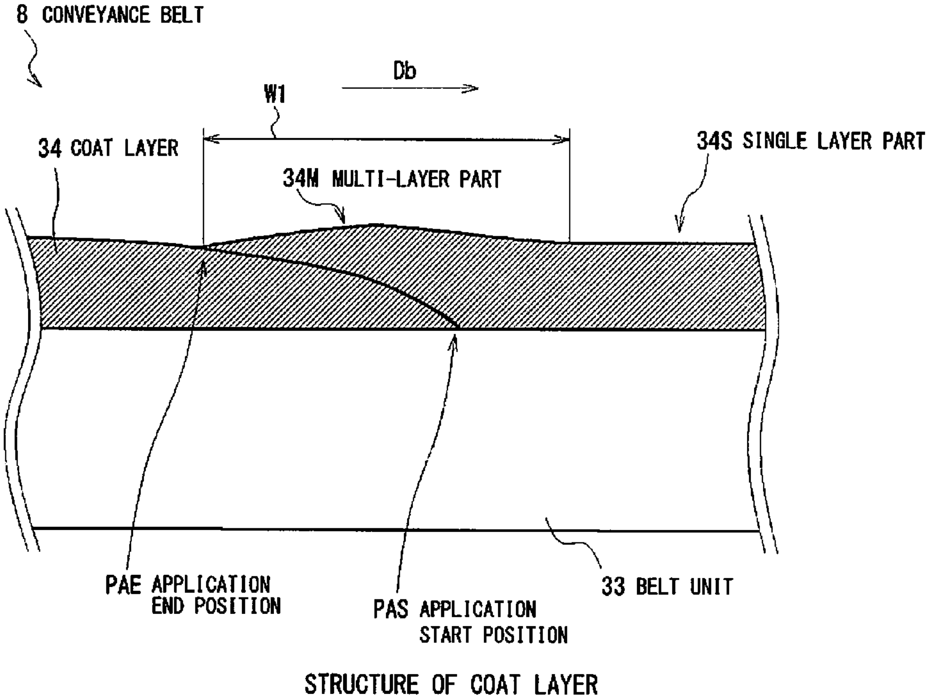
FIG. 2 is a schematic diagram illustrating a structure of a coat layer.
Figure 3:
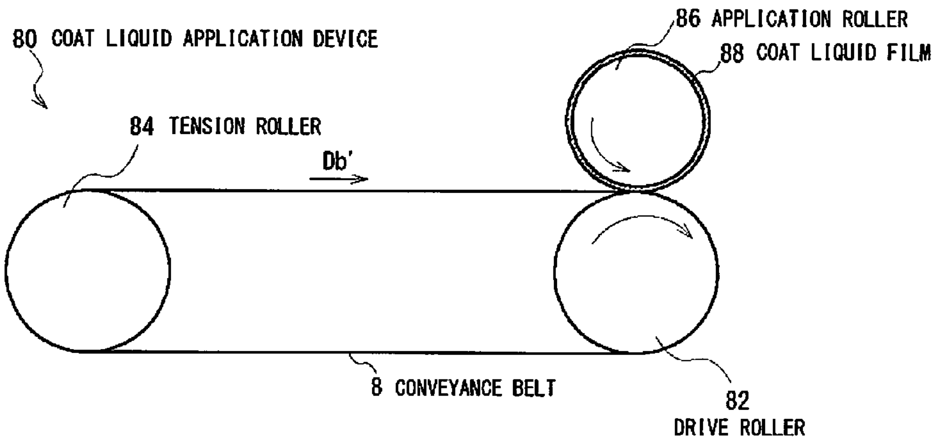
FIG. 3 is a schematic diagram illustrating a state where the coat layer is formed.

Coat layer 34 is formed by coat liquid application device 80 illustrated in FIG. 3 on the surface of belt part 33 before conveyance belt 8 is incorporated in color printer 1. Coat liquid application device 80 is configured to include drive roller 82, tension roller 84, and application roller 86, and forms coat layer 34 on conveyance belt 8 using a roll coating method. Conveyance belt 8 is stretched around drive roller 82 and tension roller 84, and is conveyed in belt forward direction Db' by the rotational driving force of drive roller 82. Application roller 86 is provided above drive roller 82 across conveyance belt 8, and an outer peripheral surface of application roller 86 is brought into contact with belt part 33 (FIG. 2) of conveyance belt 8. Application roller 86 holds an acrylic coat liquid on the outer peripheral surface to form coat liquid film 88. Coat liquid application device 80 respectively rotates drive roller 82 in the clockwise direction and application roller 86 in the counterclockwise direction in FIG. 3 to apply coat liquid film 88 of application roller 86 to belt part 33 of conveyance belt 8, thereby forming coat layer 34 (FIG. 2).

When the roll coating method is used, coat liquid application device 80 starts the application of coat liquid film 88 from application start position PAS illustrated in FIG. 2, causes conveyance belt 8 to make one round in belt forward direction Db', and finishes the application of coat liquid film 88 at application end position PAE beyond application start position PAS. In other words, coat liquid application device 80 provides multi-layer part 34M that is a region where parts of coat layer 34 overlap each other between application start position PAS and application end position PAE, and thereby forms coat layer 34 over the entire circumferential surface of endless conveyance belt 8 without any space. Accordingly, single layer part 34S (first reflection characteristic part) having a flat surface, and multi-layer part 34M (second reflection characteristic part) having a surface bulged in a convex shape are formed in coat layer 34. Multi-layer part length W1 that is a length in belt forward direction Db of multi-layer part 34M is made to approximately 5 mm. Incidentally, multi-layer part length W1 is a value measured by viewing a ruler being brought directly into contact with multi-layer part 34M.

Further, four transfer rollers 14 corresponding to four photoconductive drums 40 are rotatably provided inward of conveyance belt 8 in transfer unit 12 (FIG. 1) by being sequentially arranged from the front to the rear. With this, transfer unit 12 transfers toner images on the surfaces of four photoconductive drums 40 onto the surface of recording paper S by the application of the transfer bias voltage to transfer rollers 14 when a print image is formed, while sequentially sandwiching recording paper S, that is conveyed by conveyance belt 8 via feed conveyance path 16, between upper-side portions of the surfaces of transfer rollers 14 and lower-side portions of the surfaces of the corresponding four photoconductive drums 40. In this manner, transfer unit 12 transfers the toner images of four colors onto the surface of recording paper S, and hands over recording paper S onto which the toner images are transferred to fixation unit 18.

Fixation unit 18 is disposed at the rear side of transfer unit 12 in image formation section 7. Fixation unit 18 fixes the toner images to the surface of recording paper S. Fixation unit 18 includes a recording paper path formed in the center portion thereof so as to allow recording paper S to pass therethrough, and is rotatably provided with heat generation roller 20 and pressurization roller 22 at the upper side and the lower side of the recording paper path, respectively. With this, when a print image is formed, fixation unit 18 captures recording paper S on which the toner images are transferred in the recording paper path from transfer unit 12, and sandwiches it between heat generation roller 20 and pressurization roller 22 that rotate in directions reverse to each other. Further, fixation unit 18 fixes the toner images to the surface of recording paper S by heating and pressurizing recording paper S between heat generation roller 20 and pressurization roller 22 that rotate in directions reverse to each other. Fixation unit 18 then hands over recording paper S to discharge conveyance path 24 located at the downstream side in the conveyance direction. In this manner, fixation unit 18 fixes the toner images of four colors to the surface of recording paper S to form a print image, conveys recording paper S on which the print image is formed through discharge conveyance path 24, and discharges it to recording paper delivery unit 26.

Further, transfer unit 12 includes a disposal toner tank 28 of a substantially flat box-type provided with belt cleaning blade 27 that removes the toner adhering to the surface of conveyance belt 8. Disposal toner tank 28 presses an upper-rear edge portion of belt cleaning blade 27 that directs upwardly in the obliquely rear direction against the surface of a lower flat portion of conveyance belt 8. With this, when conveying conveyance belt 8 in the conveyance direction, transfer unit 12 removes the toner adhering to the surface of conveyance belt 8 by belt cleaning blade 27 to drop it in disposal toner tank 28. In this manner, transfer unit 12 removes the toner adhering to the surface of conveyance belt 8 to allow conveyance belt 8 to be repeatedly used for transferring toner images onto recording paper S. Further, as described above, coat layer 34 is formed on the surface of conveyance belt 8. With this, color printer 1 can prevent the generation of an unevenness due to wear of the surface of conveyance belt 8, or a cleaning failure of the surface of conveyance belt 8 due to adhesion of toner or substances from paper powders inside color printer 1, and thereby can maintain cleaning characteristics with respect to the conveyance belt 8.

1-2. Configuration of Image Formation Unit

Image formation units 10A to 10D are similarly configured except for toners of different colors being used for development of the electrostatic latent images. Accordingly, image formation units 10A to 10D are collectively described as image formation unit 10 hereinafter. As illustrated in FIG. 1, image formation unit 10 includes development device 30 and toner cartridge 32. Development device 30 includes a case formed in an approximately J-character shape, and provided with supply roller 36, development roller 38, photoconductive drum 40, LED head 42, charge roller 44, and cleaning unit 46. Supply roller 36 supplies toner stored in toner cartridge 32 to the side of development roller 38. Charge roller 44 uniformly charges the surface of photoconductive drum 40. LED head 42 exposes light on the charged surface of photoconductive drum 40 on the basis of printing data to form an electrostatic latent image. Development roller 38 causes the toner to be charged and electrostatically adhere to the electrostatic latent image formed on photoconductive drum 40, thereby forming a toner image having a predetermined layer thickness. Cleaning unit 46 removes the toner remaining on the surface of photoconductive drum 40 after the toner image is transferred. Photoconductive drum 40 supports an electrostatic latent image, and further supports a toner image obtained such that the electrostatic latent image is developed with the toner.

In the configuration, image formation unit 10 supplies toner from toner cartridge 32 to development device 30. Subsequently, image formation unit 10 forms an electrostatic latent image, while rotating photoconductive drum 40 in such a manner that charge roller 44 uniformly charges the surface of photoconductive drum 40, and LED head 42 exposes light on the surface of photoconductive drum. 40 on the basis of printing data. Subsequently, image formation unit 10 applies a development bias voltage to development roller 38 to cause the toner supplied by supply roller 36 to electrostatically adhere to the electrostatic latent image formed on photoconductive drum 40, thereby forming a toner image. In addition, image formation unit 10 sandwiches recording paper S conveyed by conveyance belt 8 between transfer roller 14 and photoconductive drum 40 to transfer the toner image on the surface of photoconductive drum 40 onto the surface of recording paper S.

1-3. Circuit Configuration of Color Printer

Figure 4:
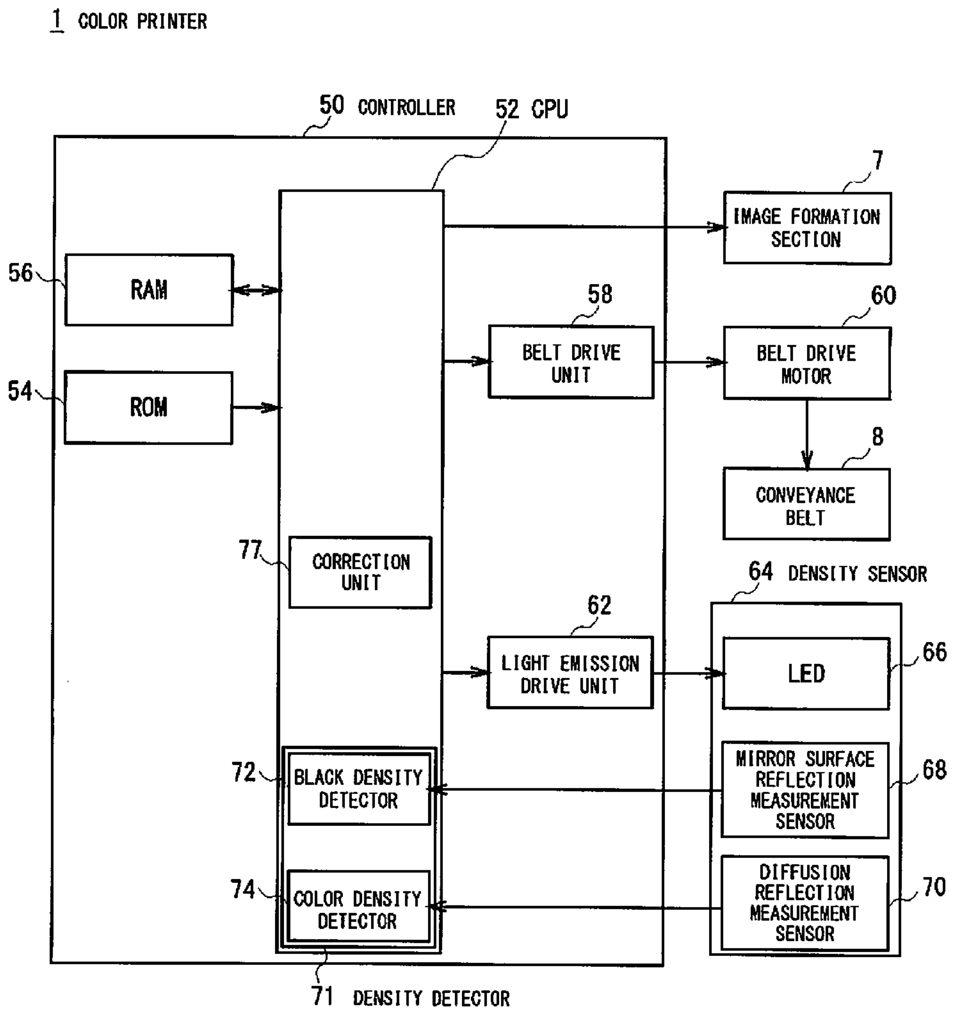
FIG. 4 is a block diagram illustrating a circuit configuration of the color printer.

In color printer 1, as illustrated in FIG. 4, controller 50 controls the respective units in a centralized manner. Controller 50 is configured to mainly include a central processing unit (CPU), and reads out a predetermined program from read only memory (ROM) 54 and uses random access memory (RAM) 56 as a work memory to control the respective units, thereby executing various processing such as calibration processing or density correction processing.

Belt drive unit 58 drives belt drive motor 60 at a predetermined speed in accordance with the control by controller 50 to convey conveyance belt 8 by a predetermined distance. Light emission drive unit 62 drives LED 66 in density sensor 64 in accordance with the control by controller 50, and causes LED 66 to emit irradiation light that is infrared light of a predetermined intensity. Black density detector 72 in density detector 71 acquires a specular reflection light quantity value as a detection result by specular reflection measurement sensor 68 in density sensor 64. Color density detector 74 in density detector 71 acquires a diffused reflection light quantity value as a detection result by diffused reflection measurement sensor 70 in density sensor 64. Further, controller 50 supplies, when performing the density correction processing, printing data on a patch pattern to image formation section 7 to cause conveyance belt 8 to print the patch pattern.

Figure 5:
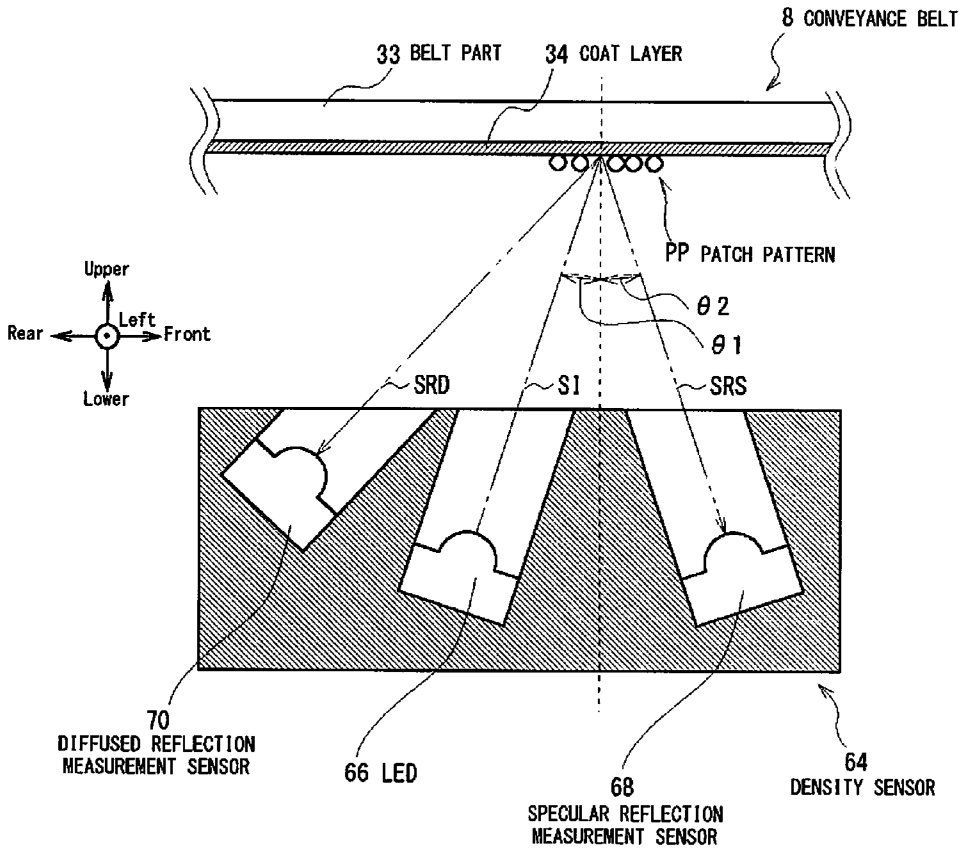
FIG. 5 is a schematic diagram illustrating a configuration of density sensor.

As illustrated in FIG. 5, density sensor 64 is configured to include LED 66, specular reflection measurement sensor 68, and diffused reflection measurement sensor 70. LED 66 is driven by light emission drive unit 62 (FIG. 4), and irradiates conveyance belt 8 with irradiation light SI that is infrared light at an incident angle of θ1. Specular reflection measurement sensor 68 detects the light quantity (intensity) of specular reflection light SRS that reflects at a reflection angle of θ2, which is the same angle as incident angle θ1 of irradiation light SI. The detected light quantify is then converted into a light reception voltage value, and uses this voltage value to supply a specular reflection light quantity value as a measurement result to black density detector 72 (FIG. 4). Diffusion reflection measurement sensor 70 detects the light quantity (intensity) of diffused reflection light SRD that reflects at an angle different from incident angle θ1 of irradiation light SI to convert it into a light reception voltage value, and supplies a diffused reflection light quantity value as a measurement result to color density detector 74 (FIG. 4). Hereinafter, specular reflection light SRS and diffused reflection light SRD are also collectively called reflection light SR.

Here, image formation on recording paper S is performed by transferring a toner image that is carried on the surface of photoconductive drum 40 onto recording paper S. Accordingly, as the quantity of the toner carried on the surface of photoconductive drum 40 is increased, the image to be formed on recording paper S becomes deep in color. Meanwhile, if the number of times of the image formation onto recording paper S is increased, toner is deteriorated to gradually weaken the charge ability of the toner. Accordingly, if a predetermined development bias voltage is applied to development roller 38 to continuously form images, the quantity of toner adhering to photoconductive drum 40 by traveling from development roller 38 is increased. Along with this, the image formed on recording paper S gradually becomes deep in color. In this manner, if the predetermined development bias voltage is maintained in spite of the number of sheets of printed recording paper S being increased, the density of the image may become inappropriate, and a good printing result may fail to be obtained. Moreover, other possible causes of a variation in the density of the image are a temperature change by a predetermined value or more inside color printer 1, a replacement of toner cartridge 32, or the like.

Hence, on the occasion of an event where the density may vary, that is, every time the predetermined number of sheets of recording paper S are printed, for example, controller 50 causes image formation section 7 to form a patch pattern for density detection on conveyance belt 8, and for density sensor 64 to detect the density of the patch pattern. After that, controller 50 causes density detector 71 to acquire a specular reflection light quantity value and a diffused reflection light quantity value. Subsequently, controller 50 enables stable printing in such a manner that correction unit 77 corrects image formation conditions, such as the development bias voltage with respect to development roller 38, the exposure luminance of LED head 42, gamma correction, on the basis of the acquired reflection light quantity values, and corrects the density accordingly.

Controller 50 performs a calibration processing for adjusting the intensity of irradiation light SI such that the light quantity of specular reflection light SRS becomes a predetermined value in advance, as a pre-stage, before density correction processing is performed. This prevents any variation in the operations of density sensor 64 before the density correction processing, and brings the operational characteristics within a predetermined range. Such calibration processing is performed on the basis of a specular reflection light quantity value of specular reflection light SRS from single layer part 34S in coat layer 34 of conveyance belt 8. After the calibration processing is finished, controller 50 executes a density correction processing by printing a patch pattern on conveyance belt 8, and detecting reflection light SR from the patch pattern.

1-4. Calibration Processing

Figure 6A:
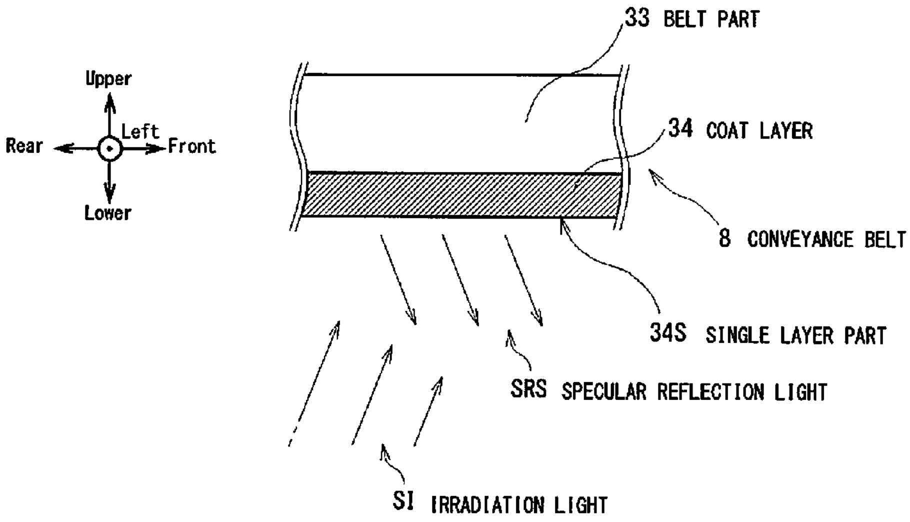
FIGS. 6A and 6B are schematic diagrams each illustrating a state of reflection light from the coat layer.
Figure 6B:
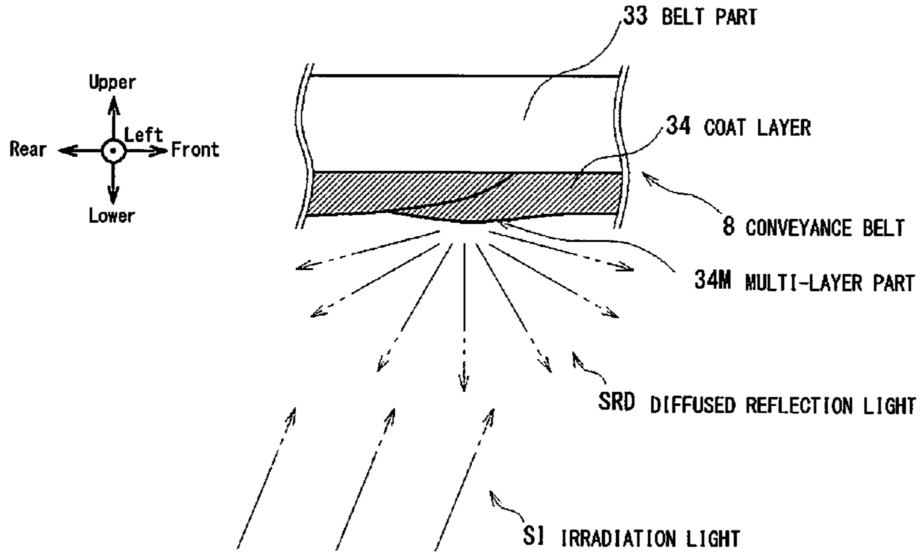

Controller 50 performs calibration processing for adjusting the intensity of irradiation light SI such that the light quantity of specular reflection light SRS becomes a predetermined value in advance, as a pre-stage before density correction processing is performed. As illustrated in FIG. 6A, when single layer part 34S (first reflection characteristics part) with a flat surface being formed is irradiated with irradiation light SI in conveyance belt 8, irradiation light SI scarcely undergoes any diffused reflection but does undergo a specular reflection, that becomes specular reflection light SRS. On the other hand, as illustrated in FIG. 6B, when multi-layer part 34M (second reflection characteristics part) with a convex shaped surface being formed is irradiated with irradiation light SI in conveyance belt 8, interference due to the thickness (non-uniformity) of coat layer 34 causes irradiation light SI to undergo a diffused reflection in multi-layer part 34M, and to be absorbed. Accordingly, if multi-layer part 34M (second reflection characteristics part) is irradiated with irradiation light SI, the light quantity detected by specular reflection measurement sensor 68 decreases to lower the specular reflection light quantity value, compared with the case where single layer part 34S (first reflection characteristics part) is irradiated therewith. Accordingly, there is a possibility that if performing a calibration on the basis of such a specular reflection light quantity value, controller 50 may fail to perform a normal calibration.

Figure 7:
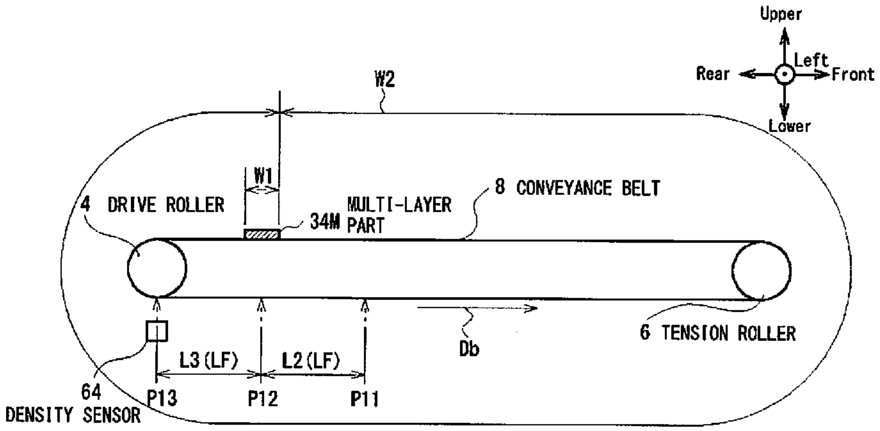
FIG. 7 is a schematic diagram used for explaining a specular reflection light quantity value measurement position (1) during the calibration.
Figure 8:
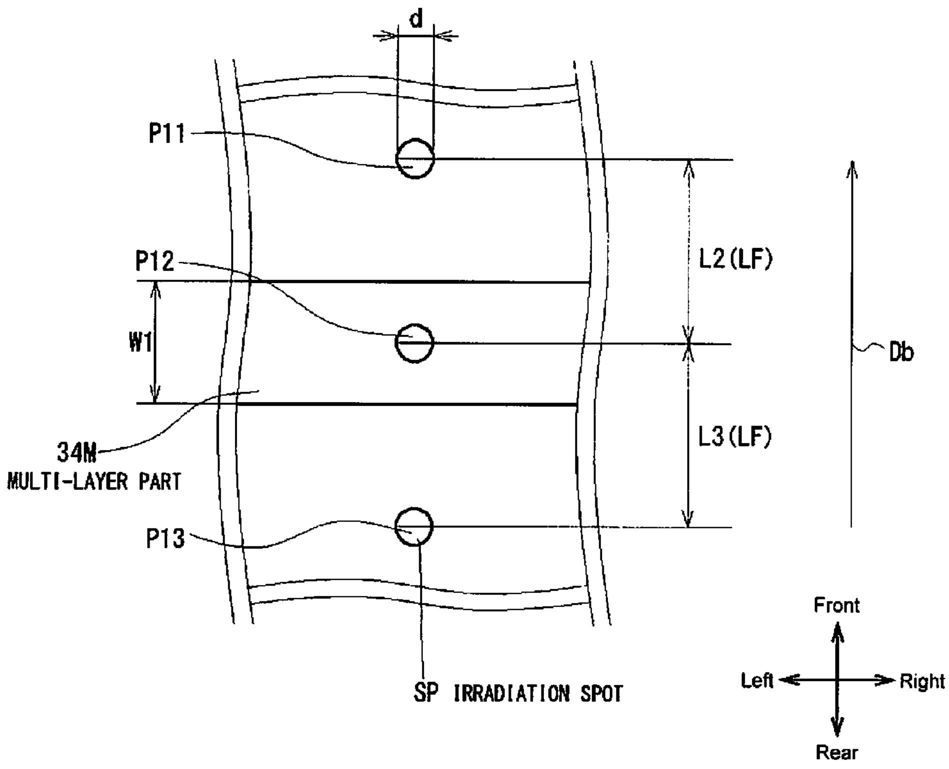
FIG. 8 is a schematic diagram used for explaining a specular reflection light quantity value measurement position (2) during the calibration.

To cope with this, controller 50 performs the calibration processing indicated below to perform the calibration while preventing any influence by multi-layer part 34M in conveyance belt 8. Controller 50 sequentially acquires specular reflection light quantity values at three positions of specular reflection light quantity value measurement positions P11, P12, and P13, as illustrated in FIG. 7, while driving conveyance belt 8. In this case, as illustrated in FIG. 8, controller 50 irradiates the surface of conveyance belt 8 with irradiation light SI at each of the specular reflection light quantity value measurement positions P11, P12, and P13 to form each irradiation spot SP, and receives specular reflection light SRS, thereby acquiring a specular reflection light quantity value. Controller 50 controls light emission drive unit 62 in accordance with the specular reflection light quantity value acquired from specular reflection measurement sensor 68 to adjust a driving current of LED 66, thereby maintaining the specular reflection light quantity value at a predetermined value. In other words, when the specular reflection light quantity value is lower than the predetermined value, controller 50 increases the driving current for LED 66 to thereby increase the light quantity of irradiation light SI, whereas when the specular reflection light quantity value higher than the predetermined value, controller 50 lowers the driving current for LED 66 to thereby lower the light quantity of irradiation light SI.

Herein, when the feed amount of conveyance belt 8 from a specular reflection light quantity value measurement position at an (i−1)-th time to a specular reflection light quantity value measurement position at an i-th time is set as belt feed amount Li, and the total number of measurement times of specular reflection light quantity values is set as n times, it is preferable to satisfy formula (1) below:

[Formula 1]

$$Li > W1 \qquad (1),$$

where i is a natural number of 2 to n, both inclusive;

L is a feed belt distance amount; and

W1 is the multi-layer part length.

This indicates that after a specular reflection light quantity value is measured once, conveyance belt 8 is conveyed by belt feed distance amount Li (L2 and L3) that is a distance longer than multi-layer part length W1, and thereafter, a specular reflection light quantity value is again measured. Accordingly, even if detecting a specular reflection light quantity value in the vicinity of an end portion of multi-layer part 34M on the front end side in belt forward direction Db in the specular reflection light quantity value measurement at a first time, for example, controller 50 can detect a specular reflection light quantity value at a position rearward of the rear end side of multi-layer part 34M in belt forward direction Db in the specular reflection light quantity value measurement at a second time. This enables controller 50 to prevent specular reflection light quantity values in multi-layer part 34M from being detected twice or more, in the specular reflection light quantity value measurement that is performed a plurality of times.

Moreover, when the circumference length of the entire circumference of conveyance belt 8 is set as belt circumference length W2, it is preferable to satisfy formula (2) below:

[Formula 2]

$$\sum_{i=2}^{n} Li < (W2 - W1), \quad (2)$$

where i is a natural number of 2 to n, both inclusive;
L is a feed belt distance amount;
W1 is the multi-layer part length; and
W2 is the belt circumference length.

This indicates that the total conveyance amount of conveyance belt 8, when the specular reflection light quantity value measurement is performed n times, is shorter than a distance obtained by subtracting multi-layer part length W1 from belt circumference length W2. Accordingly, controller 50 can complete the specular reflection light quantity value measurement at the n-th time before conveyance belt 8 is conveyed to reach specular reflection light quantity value measurement position P11 for the first time. This enables controller 50 to complete all the specular reflection light quantity value measurements during the time when conveyance belt 8 is conveyed around the entire circumference once, and prevent specular reflection light quantity values in multi-layer part 34M from being detected twice or more.

In addition, the diameter of irradiation spot SP when conveyance belt 8 is irradiated with irradiation light SI is set as spot diameter d (FIG. 8), and it is preferable to satisfy formula (3) below:

[Formula 3]

$$Li>(W1+d \quad (3),$$

where i is a natural number of 2 to n, both inclusive;
W1 is the multi-layer part length; and
d is the spot diameter.

This indicates that after a specular reflection light quantity value is measured once, conveyance belt 8 is conveyed by a belt feed amount Li (L2 and L3) that is a distance longer than a distance obtained by adding spot diameter d to multi-layer part length W1. Thereafter, a specular reflection light quantity value is again measured. Accordingly, even if detecting a specular reflection light quantity value in a state where irradiation spot SP of irradiation light SI is overlapped with the end portion of multi-layer part 34M on the front end side in belt forward direction Db in the first specular reflection light quantity value measurement, for example, controller 50 can detect a specular reflection light quantity value by positioning irradiation spot SP at a position rearward of the rear end side of multi-layer part 34M in belt forward direction Db in the second specular reflection light quantity value measurement. This enables controller 50 to prevent, in the specular reflection light quantity value measurement performed a plurality of times, irradiation spot SP from being positioned in multi-layer part 34M twice or more, and prevents specular reflection light quantity values in multi-layer part 34M from being detected twice or more.

In addition, it is preferable to combine formula (2) and formula (3), and satisfy formula (4) below:

[Formula 4]

$$\sum_{i=2}^{n} Li < (W2 - W1 - d), \quad (4)$$

where i is a natural number of 2 to n, both inclusive; and L, W1, W2 and d are as previously defined above.

This indicates that the total conveyance amount of conveyance belt 8 when the specular reflection light quantity value measurement is performed n times is shorter than a distance obtained by subtracting multi-layer part length W1 and spot diameter d from belt circumference length W2. Accordingly, controller 50 can complete the specular reflection light quantity value measurement at the n-th time before conveyance belt 8 is conveyed to reach specular reflection light quantity value measurement position P11 at the first time. This enables controller 50 to complete all the specular reflection light quantity value measurements during the time when conveyance belt 8 is conveyed around the entire circumference once. It also enables controller 50 to prevent irradiation spot SP from being positioned in multi-layer part 34M twice or more, and prevents specular reflection light quantity values in multi-layer part 34M from being detected twice or more.

In the embodiment, multi-layer part length W1 is set to 5 mm, belt circumference length W2 to 625 mm, belt feed amount Li (L2 and L3) to 74 mm, the total number of measurement times n to three times, and spot diameter d to 1 mm. Herein, the total number of measurement times n is preferably set from three times to six times.

1-5. Calibration Processing Procedure

Figure 9:
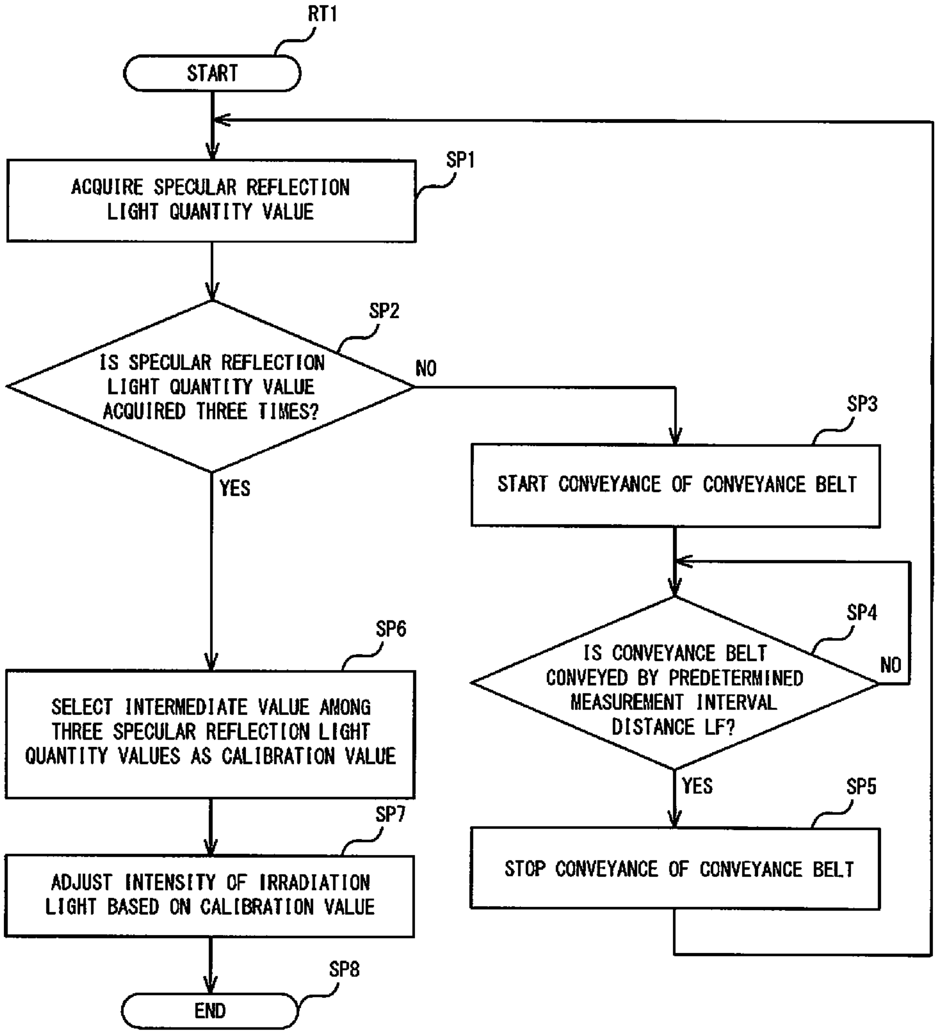
FIG. 9 is a flowchart illustrating a calibration processing procedure.

Next, a specific processing procedure of calibration processing by color printer 1 is described in detail using the flowchart of FIG. 9. Controller 50 reads a calibration processing program from ROM 54 and executes it to start calibration processing procedure RT1, and proceeds to Step SP1. Controller 50 controls black density detector 72 to acquire a specular reflection light quantity value from specular reflection measurement sensor 68 at Step SP1, and proceeds to Step SP2.

Controller 50 determines whether or not the acquisition of a specular reflection light quantity value is performed three times at Step SP2. If a negative result is obtained herein, this represents that the acquisition of a specular reflection light quantity value is not performed three times. In this case, controller 50 proceeds to Step SP3, controls belt drive unit 58 to start the conveyance of conveyance belt 8, and proceeds to Step SP4.

Controller 50 determines whether or not conveyance belt 8 is conveyed by a predetermined measurement interval distance LF at Step SP4. If a negative result is obtained herein, this represents that conveyance belt 8 is not yet conveyed by measurement interval distance LF since the conveyance of conveyance belt 8 is started at Step SP3. In this case, controller 50 returns the processing to Step SP4, and causes conveyance belt 8 to be conveyed by measurement interval distance LF. On the other hand, if an affirmative result is obtained at Step SP4, this represents that conveyance belt 8 is conveyed by measurement interval distance LF since the conveyance of conveyance belt 8 is started at Step SP3. In this case, controller 50 proceeds to Step SP5.

Controller 50 controls belt drive unit 58 to stop the conveyance of conveyance belt 8 at Step SP5, and returns the processing to Step SP1. Controller 50 repeats the processing at Step SP1 to Step SP5 to perform the acquisition of a specular reflection light quantity value three times. After performing the acquisition of a specular reflection light quantity value three times, controller 50 obtains an affirmative result at Step SP2, and proceeds to Step SP6. In this case, controller 50 acquires a measurement result of the specular reflection light quantity values as pattern 1 illustrated in FIG. 10, for example. Pattern 1 indicates that, out of three specular reflection light quantity values, respectively acquired are a maximum value (MAX) at a first time, a minimum value (MIN) at a second time, and an intermediate value (MID) between the maximum value and the minimum value at a third time.

Out of the acquired three specular reflection light quantity values, controller 50 selects the intermediate value as the calibration value used when the calibration is performed at Step SP6, and proceeds to Step SP7. Controller 50 controls light emission drive unit 62 on the basis of the calibration value and adjusts the intensity of irradiation light SI outputted from LED 66 to thereby maintain the specular reflection light quantity value at a predetermined value at Step SP7, and proceeds to Step SP8 to end calibration processing procedure RT1.

1-6. Density Correction Processing

Figure 11:
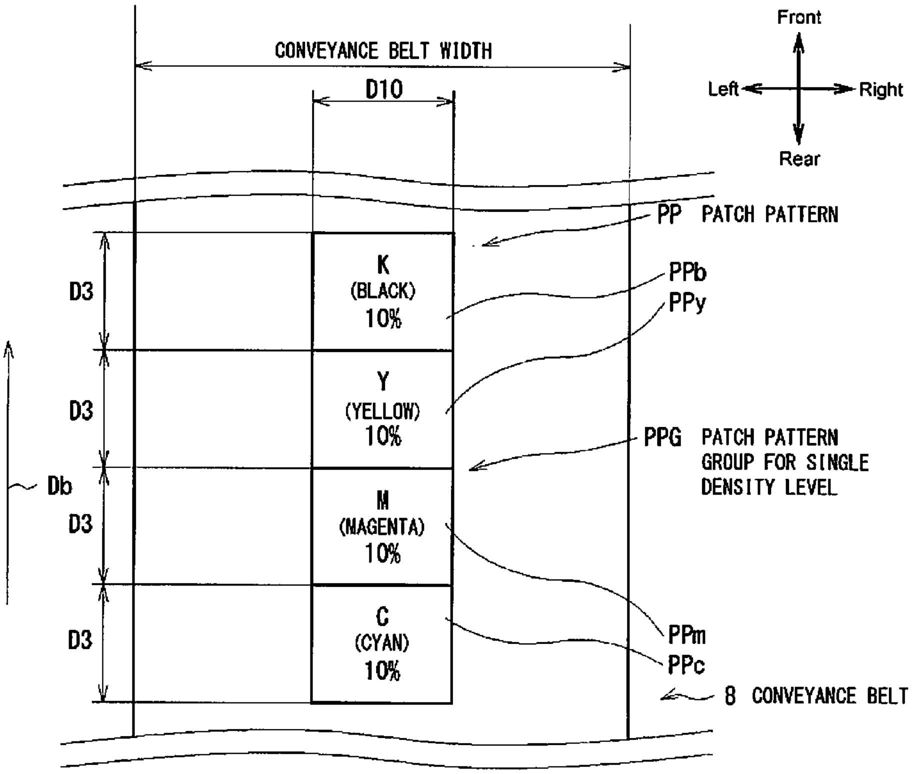
FIG. 11 is a schematic diagram illustrating a configuration of a patch pattern.

Color printer 1 is configured to enable stable printing in such a manner that, on the occasion of an event where the density may vary, a patch pattern for density detection is formed on conveyance belt 8, and after density sensor 64 detects the density of the patch pattern, image formation conditions are corrected on the basis of the detection result to correct the density. Specifically, color printer 1 corrects the development bias voltage, the exposure luminance of LED head 42, and the gamma correction value such that a difference between the density of the detected patch pattern and a target density set in advance becomes approximate 0. When the density correction processing is performed, a patch pattern as illustrated in FIG. 11 is printed on conveyance belt 8. In the central portion in the width direction of conveyance belt 8, black patch pattern PPb printed in a black color, yellow patch pattern PPy printed in a yellow color, magenta patch pattern PPm printed in a magenta color, and cyan patch pattern PPc printed in a cyan color are formed by being sequentially arranged from the front end side toward the rear end side in belt forward direction Db. Hereinafter, yellow patch pattern PPy, magenta patch pattern PPm, and cyan patch pattern PPc are collectively called color patch pattern PPcl. Black patch pattern PPb, yellow patch pattern PPy, magenta patch pattern PPm, and cyan patch pattern PPc each are formed to have a width D10 in the left and right direction and a length D3 in the front and rear direction. Four patch patterns PP of four respective colors being arranged are regarded as one per-density level patch pattern group PPG. Assuming that the highest density level printable by color printer 1 is 100%, six per-density level patch pattern groups PPG at six density levels (10%, 25%, 50%, 75%, 80%, and 100%) are formed by being sequentially arranged from the front end side toward the rear end side in belt forward direction Db. In FIG. 11, only per-density-level patch pattern group PPG level at the density of 10% is illustrated, and per-density-level patch pattern groups PPG at the other density levels are omitted from the illustration.

Meanwhile, the black toner absorbs irradiation light SI that is infrared light, and decreases the light quantity of specular reflection light SRS that undergoes specular reflection in conveyance belt 8. Accordingly, as black patch pattern PPb becomes deeper in color, the output from specular reflection measurement sensor 68 is reduced. Therefore, controller 50 detects shades (printing density) of black patch pattern PPb on the basis of a specular reflection light quantity value from specular reflection measurement sensor 68. In other words, when a portion where no black patch pattern PPb is formed is irradiated with irradiation light SI, irradiation light SI undergoes specular reflection on the surface of conveyance belt 8 without being absorbed by the black toner. This results in a large specular reflection light quantity value. On the other hand, when black patch pattern PPb at the density of 100% is irradiated with irradiation light SI, most of irradiation light SI is absorbed by the black toner. This results in a small specular reflection light quantity value. However, when black patch pattern PPb is positioned in multi-layer part 34M, and black patch pattern PPb is irradiated with irradiation light SI, interference due to the thickness (non-uniformity) of coat layer 34 causes irradiation light SI to undergo diffused reflection in multi-layer part 34M, and to be absorbed. Accordingly, if multi-layer part 34M is irradiated with irradiation light SI, the light quantity detected by specular reflection measurement sensor 68 decreases to lower the specular reflection light quantity value, compared with the case where single layer part 34S is irradiated therewith. Accordingly, there is a possibility that if performing density correction on the basis of such a specular reflection light quantity value, controller 50 may fail to perform normal density correction. To cope with this, controller 50 performs the density correction processing indicated below to perform the density correction while preventing any influence by multi-layer part 34M in conveyance belt 8. Meanwhile, toner other than the black toner (cyan toner, magenta toner, and yellow toner) causes irradiation light SI that is infrared light to undergo a diffused reflection. Accordingly, the output from diffused reflection measurement sensor 70 is increased proportional to the density of color patch pattern PPcl. Therefore, controller 50 detects shades (printing density) of color patch pattern PPcl on the basis of a diffused reflection light quantity value from diffused reflection measurement sensor 70.

Meanwhile, when multi-layer part 34M is irradiated with irradiation light SI, specular reflection light SRS largely decreases. However, diffused reflection light SRD does not largely change as much as specular reflection light SRS does. Accordingly, even when multi-layer part 34M is irradiated with irradiation light SI, the density detection of color patch pattern PPcl on the basis of a diffused reflection light quantity value is unlikely to be influenced by the convex shape of multi-layer part 34M, compared with the density detection of black patch pattern PPb on the basis of a specular reflection light quantity value.

1-7. Patch Pattern Printing Processing

Controller 50 prints patch pattern PP, as illustrated in FIG. 11, on conveyance belt 8 when the density correction processing is performed.

1-8. Patch Pattern Printing Processing Procedure

Figure 12:
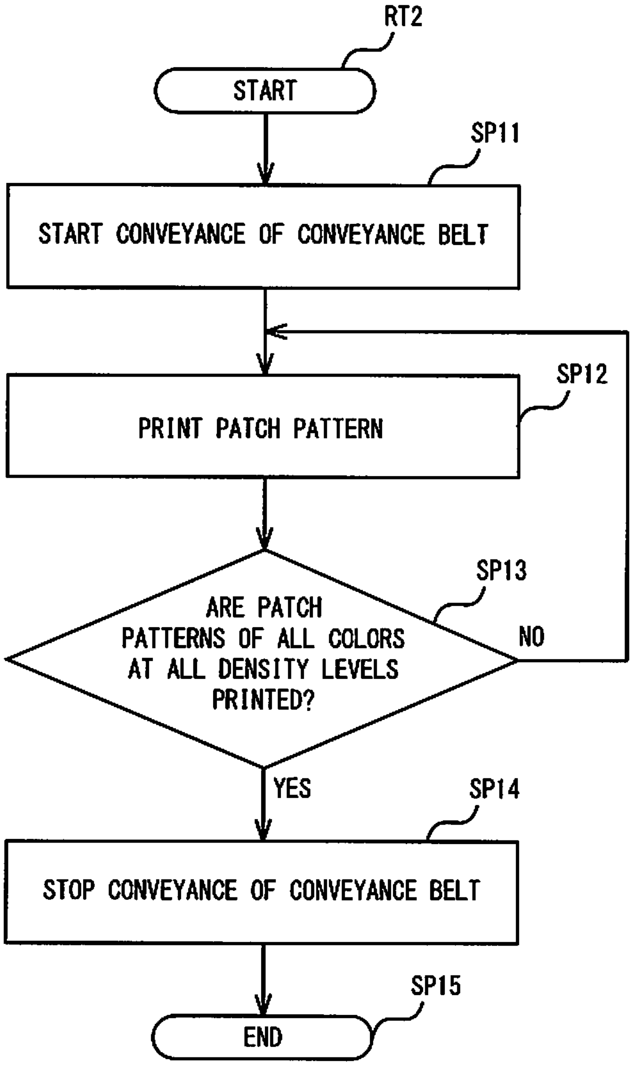
FIG. 12 is a flowchart illustrating a patch pattern printing processing procedure.

Next, a specific processing procedure of the patch pattern printing processing by color printer 1 is described in detail using the flowchart of FIG. 12. Controller 50 reads a patch pattern printing processing program from ROM 54 and executes it to start the patch pattern printing processing procedure RT2, and proceeds to Step SP11. Controller 50 controls belt drive unit 58 to start the conveyance of conveyance belt 8 at Step SP11, and then proceeds to Step SP12.

At Step SP13, controller 50 supplies printing data of a patch pattern to image formation section 7 to cause conveyance belt 8 to print the patch pattern at Step SP12, and then proceeds to Step SP13.

Controller 50 determines whether or not printing for all patch patterns of the four colors of cyan (C), magenta (M), yellow (Y), and black (K) at six density levels (10%, 25%, 50%, 75%, 80%, and 100%) is completed. If a negative result is obtained herein, this represents that the printing for all the patch patterns is not yet completed. In this case, controller 50 proceeds to Step SP12, and prints a next patch pattern. On the other hand, if an affirmative result is obtained at Step SP13, this represents that the printing for the patch patterns at all the density levels with respect to all the colors is completed. In this case, controller 50 proceeds to Step SP14.

Controller 50 controls belt drive unit 58 to stop the conveyance of conveyance belt 8 at Step SP14, and proceeds to the Step SP15 to end patch pattern printing processing procedure RT2.

1-9. Patch Pattern Sensing Processing

Figure 13:
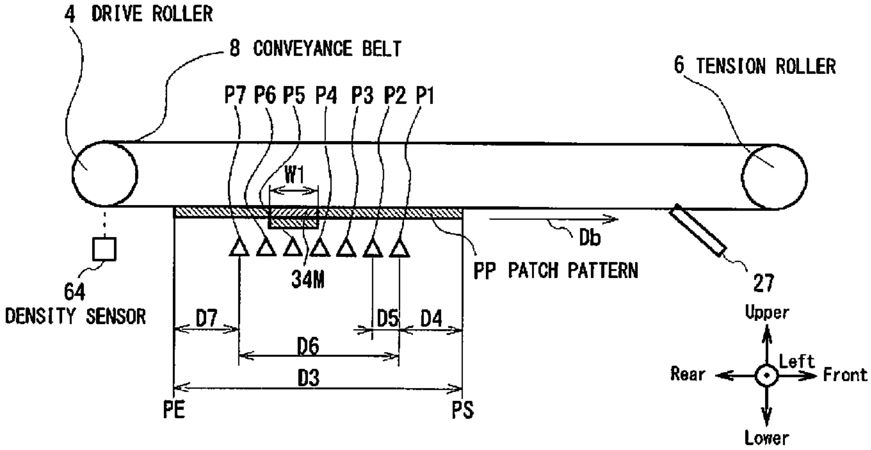
FIG. 13 is a schematic diagram used for explaining a specular reflection light quantity value measurement position (1) during density correction.
Figure 14:
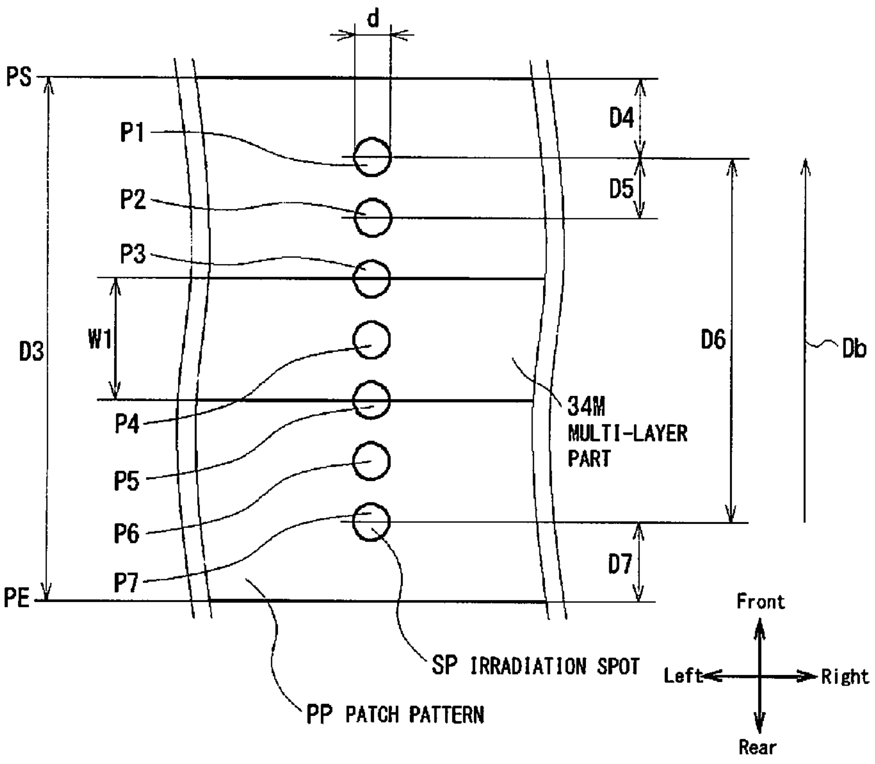
FIG. 14 is a schematic diagram used for explaining a specular reflection light quantity value measurement position (2) during the density correction.

Hereinafter, the process is described of sensing the density of black patch pattern PPb. Controller 50 sequentially acquires specular reflection light quantity values at seven positions of specular reflection light quantity value measurement positions P1, P2, P3, P4, P5, P6, and P7 illustrated in FIG. 13 and FIG. 14. In FIG. 13 and FIG. 14, for example, only patch pattern PP for a single color, such as black patch pattern PPb at the density of 10%, is illustrated, and other patch patterns PP are omitted without being illustrated. In this case, controller 50 irradiates, at each of specular reflection light quantity value measurement positions P1, P2, P3, P4, P5, P6, and P7, one patch pattern PP on conveyance belt 8 with irradiation light SI to form irradiation spot SP, and receives specular reflection light SRS, thereby acquiring a specular reflection light quantity value and detecting the density of patch pattern PP. Controller 50 controls the image formation conditions in accordance with the specular reflection light quantity value acquired from specular reflection measurement sensor 68, thereby performing density correction. In other words, when the detected density of patch pattern PP is lower than the original density for printing, controller 50 changes the image formation condition such that the density becomes high, whereas when the detected density of patch pattern PP is higher than the original density for printing, controller 50 changes the image formation condition such that the density becomes low.

Herein, the length from patch pattern front end portion PS that is a front end portion of patch pattern PP in belt forward direction Db to specular reflection light quantity value measurement position P1 at the first time is a distance D4, and the interval between specular reflection light quantity value measurement positions P is a distance D5. Moreover, the length from specular reflection light quantity value measurement position P1 at the first time to specular reflection light quantity value measurement position P7 at a seventh time is distance D6. In addition, the length from specular reflection light quantity value measurement position P7 at the seventh time to patch pattern rear end portion PE that is a rear end portion of patch pattern PP in belt forward direction Db is the distance D7. Moreover, time T3, time T4, time T5, time T6, and time T7, respectively corresponding to distance D3, distance D4, distance D5, distance D6, and distance D7, each indicate the time required for conveying conveyance belt 8 by each distance. In the embodiment, length D3 is 25.4 mm, distance D4 is 8.47 mm, distance D5 is 1.78 mm, distance D6 is 10.7 mm, and distance D7 is 6.19 mm.

1-10. Patch Pattern Sensing Processing Procedure

Figure 15:
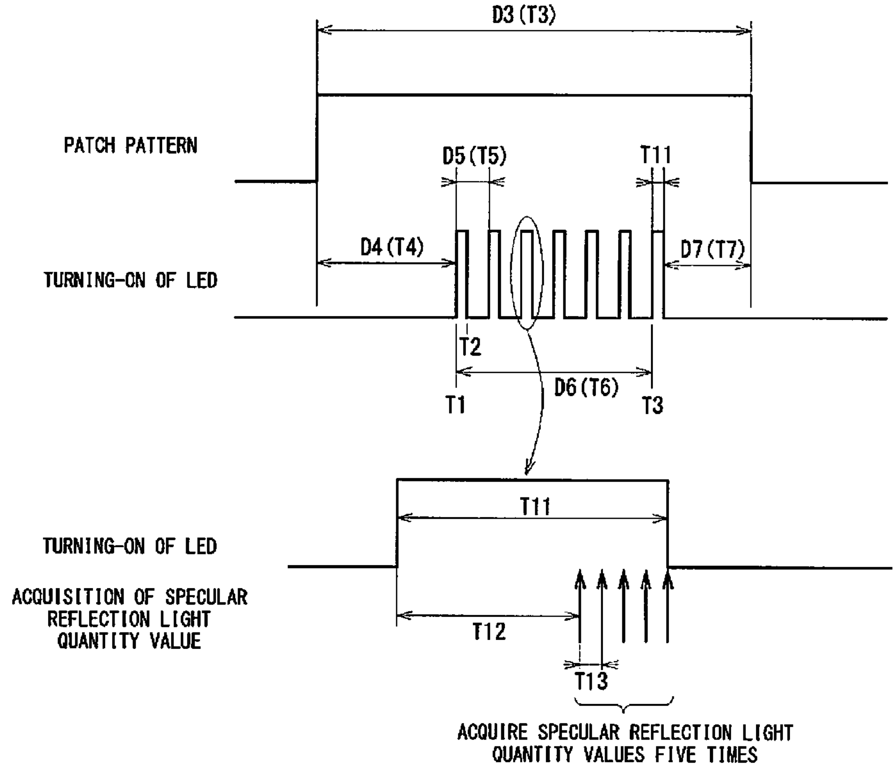
FIG. 15 is a timing chart illustrating a timing of the density measurement of the patch pattern.
Figure 16:
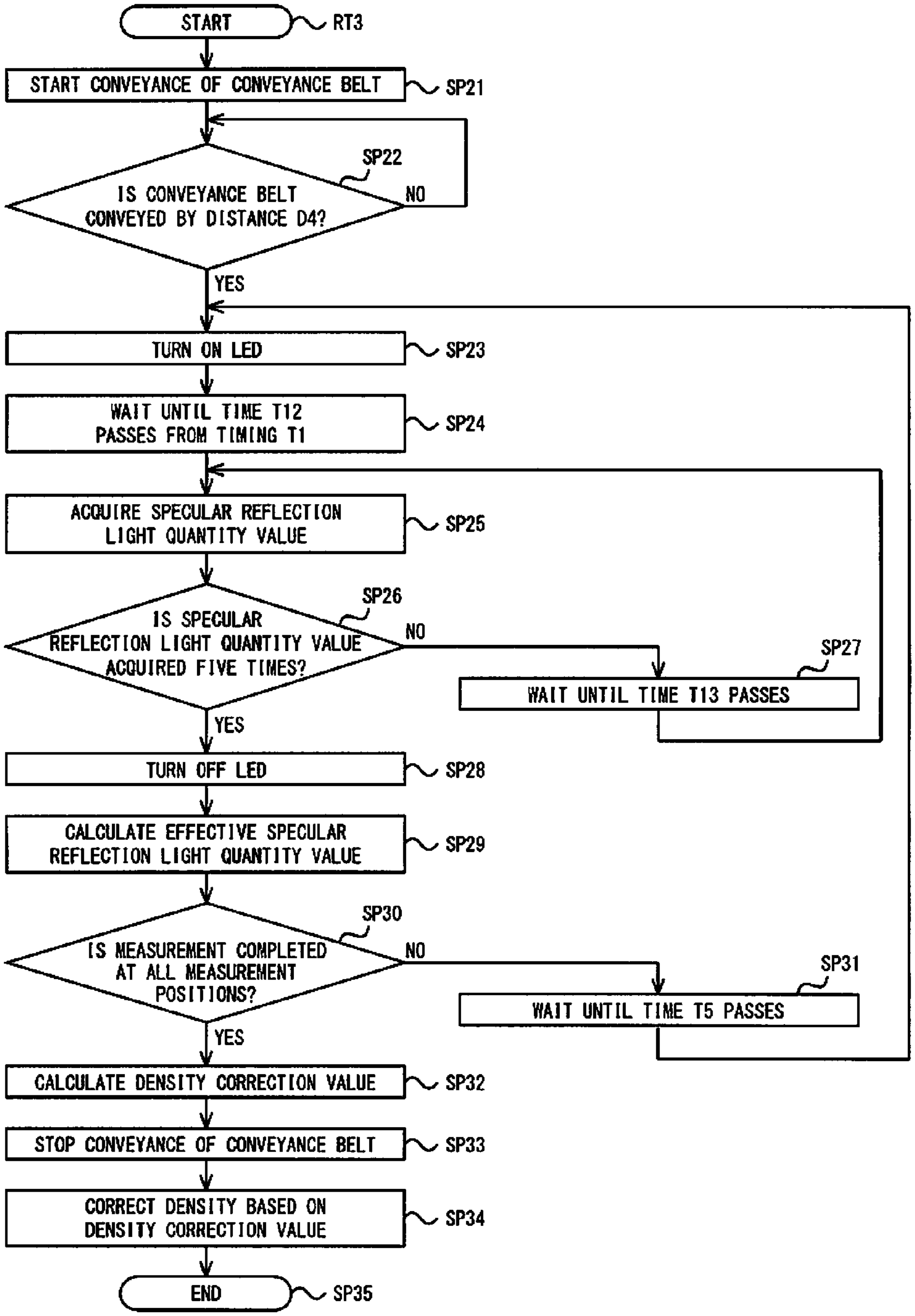
FIG. 16 is a flowchart illustrating a patch pattern read processing procedure.

Next, a specific processing procedure of the patch pattern sensing processing by color printer 1 is described in detail using the timing chart of FIG. 15 and the flowchart of FIG. 16. Hereinafter, processing for a single patch pattern PP, for example, black patch pattern PPb at the density of 10%, is described. Moreover, when the flowchart is started, conveyance belt 8 is located at a position where patch pattern front end portion PS can be irradiated with irradiation light SI. Controller 50 reads a patch pattern sensing processing program from ROM 54 and executes it to start patch pattern sensing processing procedure RT3, and then proceeds to Step SP21. Controller 50 controls belt drive unit 58 to start the conveyance of conveyance belt 8 at Step SP21, and then proceeds to Step SP22.

Controller 50 determines whether or not conveyance belt 8 is conveyed by distance D4 at Step SP22. If a negative result is obtained herein, this represents that conveyance belt 8 is not yet conveyed by distance D4 since the conveyance of conveyance belt 8 was started at Step SP22. In this case, controller 50 returns the processing to Step SP22, and causes conveyance belt 8 to be conveyed by distance D4. On the other hand, if an affirmative result is obtained at Step SP22, this represents that conveyance belt 8 is conveyed by distance D4 since the conveyance of conveyance belt 8 is started at Step SP21, and thus density sensor 64 reaches specular reflection light quantity value measurement position P1 that is a measurement position at the first time. In this case, controller 50 then proceeds to Step SP23.

Controller 50 drives light emission drive unit 62 to turn on LED 66 at timing T1 of FIG. 15 at Step SP23, and proceeds to Step SP24. Controller 50 waits until time T12 passes from timing T1 at Step SP24, and proceeds to Step SP25. Controller 50 acquires a specular reflection light quantity value detected by specular reflection measurement sensor 68 from black density detector 72 at Step SP25, and proceeds to Step SP26. In this manner, controller 50 waits until time T12 passes since LED 66 is turned on, waits on starting the output until when LED 66 starts irradiation, and acquires a specular reflection light quantity value after LED 66 is in a state where irradiation light SI is outputted with stability.

Controller 50 determines whether or not the acquisition of a specular reflection light quantity value is performed five times at Step SP26. If a negative result is obtained herein, this represents that the acquisition of a specular reflection light quantity value has not been performed five times. In this case, controller 50 proceeds to Step SP27, waits until time T13 passes, and returns the processing to Step SP25. Controller 50 repeats the processing at Step SP25 to Step SP27 to perform the acquisition of a specular reflection light quantity value five times. After performing the acquisition of a specular reflection light quantity value five times, controller 50 obtains an affirmative result at Step SP26, and proceeds to Step SP28.

Controller 50 controls light emission drive unit 62 to turn off LED 66 at timing T2 of FIG. 15 at Step SP28, and proceeds to Step SP29. As illustrated in FIG. 15, the lighting time of LED 66 is time T11. Meanwhile, LED 66, from continuously being turned on for a long period of time, causes a deterioration of the characteristics of LED 66. Accordingly, controller 50 cyclically turns off LED 66 to thereby prevent the characteristics of LED 66 from being deteriorated. In a case of the embodiment, time T11 is set by a duty ratio in which LED 66 is turned on for only 2.6 ms for every 10 ms cycle.

Controller 50 calculates a value in which three values obtained by excluding the maximum value and the minimum value from the specular reflection light quantity values acquired five times are averaged, as an effective specular reflection light quantity value at Step SP29, and then proceeds to Step SP30. In this manner, controller 50 acquires specular reflection light quantity values five times at a single specular reflection light quantity value measurement position, and calculates a value in which three intermediate values obtained by excluding the maximum value and the minimum value that may largely fall outside are averaged, as an effective specular reflection light quantity value, thereby eliminating any influence that the specular reflection light quantity value may vary due to noise.

Controller 50 determines whether or not the measurement is completed at all the seven positions of specular reflection light quantity value measurement positions P1 to P7 at Step SP30. If a negative result is obtained herein, this represents that the measurement at all the specular reflection light quantity value measurement positions is not yet completed. In this case, controller 50 proceeds to Step SP31, waits until time T5 passes from timing T1 when LED 66 is turned on at a previous time, and returns the processing to Step SP23. Controller 50 repeats the processing at Step SP23 to Step SP31 to respectively acquire specular reflection light quantity values five times at the seven specular reflection light quantity value measurement positions to calculate seven effective specular reflection light quantity values. After the measurement at all the seven specular reflection light quantity value measurement positions P1 to P7 is completed, controller 50 obtains an affirmative result at Step SP30, and proceeds to Step SP32.

Controller 50 calculates, out of the calculated seven effective specular reflection light quantity values, a value in which three intermediate values obtained by excluding one maximum value, and three values from the lowest including the minimum value are averaged, as a density correction value at Step SP32, and then proceeds to Step SP33.

As illustrated in FIG. 14, irradiation spot SP is irradiated with an interval of distance D5. When multi-layer part 34M is present in a patch pattern where the measurement is performed, there is a possibility that three irradiation spots SP may be located in multi-layer part 34M at the maximum in the embodiment. When irradiation spot SP is located in multi-layer part 34M, a smaller specular reflection light quantity value is obtained than in the case where irradiation spot SP is located in single layer part 34S. Controller 50 excludes three values from the lowest including the minimum value. In this manner, controller 50 calculates a value in which three intermediate values obtained by excluding one maximum value, and three values from the lowest including the minimum value from the calculated seven effective specular reflection light quantity values are averaged, as a density correction value, thereby making it possible to eliminate any influence on the density correction value caused by multi-layer part 34M.

Herein, if the lower values including the minimum value are excluded in calculating the density correction value, it is preferable to satisfy formula (5) below:

[Formula 5]

$$D5*s<(W1+d) \quad (5),$$

where s is a natural number of 2 to n, both inclusive;

D5 is the interval between specular reflection light quantity value measurement positions P;

W1 is the multi-layer part length; and d is the spot diameter.

Controller 50 controls belt drive unit 58 to stop the conveyance of conveyance belt 8 at Step SP33, and proceeds to Step SP34. Controller 50 performs the density correction on the basis of the density correction value at Step SP34, and proceeds to Step SP35 to end patch pattern sensing processing procedure RT3.

After performing the processing described above with respect to black patch pattern PPb at the density of 10%, controller 50 similarly performs the processing by acquiring diffused reflection light quantity values with respect to yellow patch pattern PPy at the density of 10%, magenta patch pattern PPm at the density of 10%, and cyan patch pattern PPc at the density of 10%. In addition, controller 50 similarly performs the processing on the remaining five per-density-level patch pattern groups PPG (densities of 25%, 50%, 75%, 80%, and 100%), and performs density correction thereto on the basis of the acquired density correction value.

1-11. Effect

With the configuration described above, color printer 1 is configured to acquire a specular reflection light quantity value at a current specular reflection light quantity value measurement position during calibration, and convey conveyance belt 8 by measurement interval distance LF that is a distance longer than multi-layer part length W1 to acquire specular reflection light quantity value at the next specular reflection light quantity value measurement position that is apart by measurement interval distance LF from the current specular reflection light quantity value measurement position. Further, color printer 1 is configured to employ, out of three specular reflection light quantity values in total acquired at three specular reflection light quantity value measurement positions, an intermediate value as a calibration value. Accordingly, color printer 1 can exclude an abnormal specular reflection light quantity value due to multi-layer part 34M, when a specular reflection light quantity value measurement is performed once in multi-layer part 34M out of the three-time measurements. With this, color printer 1 can prevent an influence by multi-layer part 34M that is different in light reflection characteristics from single layer part 34S, and can perform calibration with high accuracy.

In addition, color printer 1 is configured to employ a value in which three intermediate values obtained by excluding one maximum value, and three values from the lowest including the minimum value from seven effective specular reflection light quantity values in total acquired at seven specular reflection light quantity value measurement positions are averaged, as a density correction value. Accordingly, color printer 1 can exclude an abnormal specular reflection light quantity value due to multi-layer part 34M, even when the specular reflection light quantity value measurement is performed three times in multi-layer part 34M out of seven-time measurements. The same applies to the diffused reflection light quantity value measurement. With this, color printer 1 can prevent any influence by multi-layer part 34M that is different in light reflection characteristics from single layer part 34S, and thereby can perform the calibration with high accuracy.

Meanwhile, some color printers are configured to form a patch pattern at a position in a conveyance belt where no flaw, hollow, or the like is formed, so that irregular reflection due to the flaw or the like is prevented, as disclosed in Japanese Laid-open Patent Publication No. 2007-206520. This color printer detects whether or not a flaw or the like is present on the surface of the conveyance belt on the basis of the magnitude of output from a specular reflection measurement sensor. In this case, however, much time is required to form a patch pattern because the conveyance belt is conveyed around the entire circumference once for detecting a flaw or the like on the conveyance belt. Moreover, a mere change of the position of the patch pattern so as to prevent the flaw or the like cannot entirely prevent an influence by multi-layer part 34M on the conveyance belt in some cases. In contrast, color printer 1 in the embodiment conveys conveyance belt 8 in a short distance without conveying conveyance belt 8 around the entire circumference once, and thereby can calibrate and perform a density correction in a short time.

Further, color printer 1 is configured to employ a calibration value on the basis of specular reflection light quantity values that are measured for a plurality of times with an interval of measurement interval distance LF that is a distance longer than multi-layer part length W1 in multi-layer part 34M. Further, color printer 1 is configured to perform a density correction on the basis of reflection light quantity values (specular reflection light quantity values and diffused reflection light quantity values) that are measured at seven positions in distance D6 sufficiently longer than multi-layer part length W1 in multi-layer part 34M. With this, color printer 1 can reliably eliminate influences on the calibration and the density correction by multi-layer part 34M.

Further, color printer 1 can prevent an influence by multi-layer part 34M by performing the simple processing of increasing the number of measurement positions compared with the conventional number thereof during the calibration and the density correction.

Moreover, a formation method of a coat layer of a conveyance belt is not limited to a roll coating method in the embodiment, but examples of the formation method include a method in which a coat agent is vapor deposited in belt part 33, for example. However, such a method involves a higher cost than the roll coating method. In contrast, in the embodiment, color printer 1 in which conveyance belt 8 including coat layer 34 formed by a roll coating method with low cost can prevent an influence by multi-layer part 34M that is formed when the roll coating method is used.

With the configuration described above, color printer 1 serving as an image formation apparatus is configured to be provided with: conveyance belt 8 in which multi-layer part 34M serves as a reflection characteristics irregular part having light reflection characteristics different from that of a surrounding surface; light emission drive unit 62, density sensor 64, and density detector 71 that perform a detection operation in which conveyance belt 8 is irradiated with irradiation light SI to detect a reflection light SR; controller 50 that performs a current detection operation, and performs a next detection operation after conveyance belt 8 is conveyed by a distance longer than a length of multi-layer part 34M along a conveyance direction of conveyance belt 8; and a correction unit 77 that performs a calibration and density correction as a correction relating to image formation on the basis of the detection results of the current detection operation and the next detection operation by density sensor 64 and in density detector 71. With this, color printer 1 can perform the correction while preventing any influence by the light reflection characteristics in multi-layer part 34M different from that of single layer part 34S.

2. Other Embodiment

Further, in the above-described embodiment, described is a case where belt feed amount Li is a predetermined measurement interval distance LF. The invention is not limited to this, and belt feed amount L2 and belt feed amount L3 may have different distances. The point is that each of belt feed amounts L2 and L3 may be longer than multi-layer part length W1.

Further, in the above-described embodiment, described is a case where multi-layer part length W1 is 5 mm, belt circumference length W2 is 625 mm, measurement interval distance LF (belt feed amount Li) is 74 mm, the total number of measurement times n is three times, and spot diameter d is 1 mm. The invention is not limited to this, but various values may be used as long as the values of multi-layer part length W1, belt circumference length W2, measurement interval distance LF (belt feed amount Li), the total number of measurement times n, and spot diameter d may satisfy formula (1) to formula (4).

In addition, in the above-described embodiment, described is a case where length D3 is 25.4 mm, distance D4 is 8.47 mm, distance D5 is 1.78 mm, distance D6 is 10.7 mm, distance D7 is 6.19 mm, multi-layer part length W1 is 5 mm, and spot diameter d is 1 mm. The invention is not limited to this, and various values may be used as long as the values of length D3, distance D4, distance D5, distance D6, distance D7, multi-layer part length W1 and spot diameter d satisfy formula (5).

In addition, in the above-described embodiment, a case is presented where formula (1) to formula (4) are satisfied during calibration. However, the invention is not limited to this, and at least formula (1) may be satisfied.

In addition, in the above-described embodiment, described is a case where four patch patterns of four respective colors being arranged are regarded as one per-density-level patch pattern group PPG, and six per-density-level patch pattern groups PPG at six density levels (10%, 25%, 50%, 75%, 80%, and 100%) are formed by being sequentially arranged. The invention is not limited to this. Per-density-level patch pattern groups PPG level may be sequentially arranged in the order of the density (100%, 80%, 75%, 50%, 25%, and 10%), for example. Moreover, various arrangements can be employed, including an arrangement in which black patch patterns PPb sequentially arranged in the order of the density, yellow patch patterns PPy sequentially arranged in the order of the density, magenta patch patterns PPm sequentially arranged in the order of the density, and cyan patch patterns PPc sequentially arranged in the order of the density are sequentially arranged.

In addition, in the above-described embodiment, described is a case where density correction processing is performed on four colors of black, yellow, magenta, and cyan. The invention is not limited to this. Even when multi-layer part 34M is irradiated with irradiation light SI, density correction processing can be omitted with respect to the colors other than the black color because the density detection of color patch pattern PPcl on the basis of a diffused reflection light quantity value is unlikely to be influenced by multi-layer part 34M compared with the density detection of black patch pattern PPb on the basis of specular reflection light quantity value.

In addition, a method of the density correction processing is not limited to the above-described method, but the density correction processing may be performed by various methods such as a more simplified method.

In addition, in the above-described embodiment, described is a case where specular reflection light quantity values are measured at three positions during calibration. The invention is not limited to this, and specular reflection light quantity values may be measured at various positions, such as two positions or less or four positions or more. Further, when specular reflection light quantity values are measured at four positions or more, if two or more intermediate values from which the maximum value and the minimum value are excluded are present, the two or more intermediate values may be averaged.

In addition, in the above-described embodiment, described is a case where when pattern 1 in the measurement result of the specular reflection light quantity values (FIG. 10) during calibration is acquired, an intermediate value at the second time is selected as a calibration value. Meanwhile, pattern 2, pattern 3, or pattern 4, for example, may be acquired as the measurement result of the specular reflection light quantity values. Pattern 2 indicates that, out of three specular reflection light quantity values, respectively acquired are maximum values at a first time and a second time, and a minimum value at a third time. In other words, the specular reflection light quantity values at the first time and at the second time are equal to each other. Pattern 3 indicates that, out of three specular reflection light quantity values, respectively acquired are a maximum value at a first time, and minimum values at a second time and at a third time. In other words, the specular reflection light quantity value at the second time and at the third time are equal to each other. Pattern 4 indicates that, out of three specular reflection light quantity values, respectively acquired are maximum values at a first time, a second time, and a third time. In other words, all of the three specular reflection light quantity values are equal to one another. In such cases, controller 50 respectively employs, as a calibration value, the maximum value in pattern 2, the minimum value in pattern 3, and the maximum value in pattern 4. This is based on a thought that specular reflection light SRS from multi-layer part 34M is not detected twice or more in the control of conveyance belt 8 in the calibration processing in the embodiment, and therefore if equal specular reflection light quantity values are acquired twice or more, there is an extremely high possibility that the specular reflection light quantity values are derived not from specular reflection light SRS from multi-layer part 34M but specular reflection light SRS from single layer part 34S. Controller 50 employs the specular reflection light quantity value as a calibration value, thereby making it possible to increase the reliability of the calibration value and perform the calibration with high accuracy.

In addition, in the above-described embodiment, described is a case where acquisition of a specular reflection light quantity value is performed five times in the density correction when LED 66 is being turned on, however, the invention is not limited to this. A specular reflection light quantity value may be acquired for various times, such as four times or less or six times or more.

In addition, in the above-described embodiment, described is a case where a measurement is performed at seven positions of specular reflection light quantity value measurement positions P1 to P7 in the density correction, however, the invention is not limited to this. A various number of specular reflection light quantity measurement positions may be provided. In this case, the increased number of specular reflection light quantity value measurement positions results in a density correction value of higher accuracy.

In addition, in the above-described embodiment, described is a case where multi-layer part length W1 is measured by viewing a ruler being brought directly into contact with multi-layer part 34M. The invention is not limited to this, and multi-layer part length W1 may be measured in such a manner that LED 66 irradiates conveyance belt 8 with irradiation light SI while conveyance belt 8 incorporated into color printer 1 is conveyed to measure a length within a range in which a light reception voltage of a specular reflection light quantity value is less than a predetermined value.

In addition, in the above-described embodiment, described is a case where the invention is applied to a color laser printer of a direct tandem system, however, the invention is not limited to this. The invention may be applied to a printer of a four-cycle system, for example.

In addition, in the above-described embodiment, described is a case where the invention is applied to a color printer, however, the invention is not limited to this. The invention may be applied to a monochrome printer.

In addition, in the above-described embodiment, described is a case where the invention is applied to the pre-stage calibration performed before the density correction, however, the invention is not limited to this. The invention may be applied to a pre-stage calibration performed before other various corrections.

In addition, in the above-described embodiment, described is a case where patch pattern PP is formed on conveyance belt 8. The invention is not limited to this, and patch pattern PP may be formed on the surface of photoconductive drum 40, for example.

In addition, in the above-described embodiment, described is a case where color printer 1 includes four image formation units 10A to 10D corresponding to toners of four colors, however, the invention is not limited to this. The color printer may include various number of image formation units, such as three or less image formation units corresponding to toners of three or less colors, or five or more image formation units corresponding to toners of five or more colors.

Moreover, in the above-described embodiment, the operation of image formation section 7 is corrected and controlled on the basis of patch pattern PP, however, the invention is not limited to this. The conveyance direction of conveyance belt 8 or the operation of the conveyance belt 8, such as the conveyance speed, in addition to image formation section 7, may be controlled on the basis of the patch pattern, for example.

In addition, in the above-described embodiment, described is a case where the invention is applied to a printer. The invention is not limited to this, but the invention may be applied to various devices, such as a copier and a facsimile machine, that perform various processing on an image, for example.

In addition, in the above-described embodiment, described is a case where color printer 1 that serves as an image formation apparatus is configured to include conveyance belt 8 that serves as a belt; light emission drive unit 62, density sensor 64, and density detector 71 that serve as a measurement unit; controller 50 that serves as a controller, and correction unit 77 that serves as a correction unit. However, the invention is not limited to this. The image formation apparatus may be configured to include a measurement unit, a controller, and a correction unit, each including various other configurations.

The invention can be used in, in addition to a computer that causes a printer to print an image, various electronic devices such as an image scanner, a facsimile device, and a copier, that perform various processing on an image.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus comprising:

a conveyance member in which a reflection characteristics irregular part having light reflection characteristics different from those of a surrounding surface part is formed;

a measurement unit configured to perform a detection operation including irradiating the conveyance member with irradiation light and detecting a reflection light;

a controller configured to perform a current detection operation, and perform a next detection operation after a surface of the conveyance member is moved by a distance longer than a reflection characteristics irregular part length that is a length of the reflection characteristics irregular part in a movement direction of the conveyance member surface; and a correction unit configured to perform a correction for image formation on the basis of detection results of the current detection operation and the next detection operation by the measurement unit, wherein the following formula (I) is satisfied:

[Formula I]

$$\sum_{i=2}^{n} Li < (W2 - W1), \quad (I)$$

where W1 is the reflection characteristics irregular part length, W2 is a circumference length of the conveyance member, Li is a movement amount of the conveyance member from a detection position at which an (i−I)-th detection operation is performed at a detection position at which an i-th detection operation is performed, and n is a total number of the detection operations, and i is a natural number of 2 to n, both inclusive.

2. The image formation apparatus according to claim 1, wherein the following formula (II) is satisfied:

[Formula II]

$$Li>(W1+d) \quad (II),$$

where d is a diameter of an irradiation spot of the irradiation light on the conveyance member and i is a natural number of 2 to n, both inclusive.

3. The image formation apparatus according to claim 2, wherein the following formula (III) is satisfied:

[Formula III]

$$\sum_{i=2}^{n} Li < (W2 - W1 - d), \quad (III)$$

where i is a natural number of 2 to n, both inclusive.

4. The image formation apparatus according to claim 1, wherein the controller performs the detection operations three times or more, and the correction unit performs the correction using an intermediate value obtained by excluding a value near a maximum value including the maximum value and a value near a minimum value including the minimum value from detection results of the detection operations three times or more.

5. The image formation apparatus according to claim 1, wherein the controller performs the detection operations three times or more, and when approximately equal values are detected in detection results of the detection operations three times or more, the correction unit performs the correction using the equal values.

6. The image formation apparatus according to claim 1, wherein the correction unit performs a calibration as a prestage of density correction by adjusting the intensity of the irradiation light to a predetermined value based on the detection result.

7. The image formation apparatus according to claim 1, further comprising an image formation section configured to transfer toner onto the conveyance member to form an image, the image formation section forms a patch pattern on the conveyance member, the measurement unit acquires density of the patch pattern by irradiating the patch pattern with the irradiation light and detecting reflected reflection light, and the correction unit performs density correction by adjusting an image formation condition in the image formation section on the basis of the acquired density of the patch pattern.

8. The image formation apparatus according to claim 7, wherein the controller acquires densities of the patch pattern multiple times within a distance longer than the reflection characteristics irregular part length, and the correction unit performs the density correction based on the densities of the patch pattern acquired multiple times.

9. The image formation apparatus according to claim 8, wherein the correction unit performs the density correction using an intermediate value obtained by excluding a value near a maximum value including the maximum value and a value near a minimum value including the minimum value from the acquired densities of the patch pattern acquired multiple times.

10. The image formation apparatus according to claim 9, wherein the following formula (VI) is satisfied:

[Formula VI]

$$D5*s<(W1+d) \quad (VI),$$

where D5 is an interval between measurement positions at which the densities of the patch pattern are acquired, and s is a natural number of 2 to n, both inclusive, indicating the number of lowest values including the minimum value excluded from the acquired densities.

11. The image formation apparatus according to claim 1, wherein a coat layer is formed on the surface of the conveyance member, and parts of the coat layer overlap each other in the reflection characteristics irregular part.

12. The image formation apparatus according to claim 1, wherein the conveyance member is a belt.

13. The image formation apparatus according to claim 1, wherein the conveyance member is a photoconductive drum.

14. The image formation apparatus according to claim 1, wherein the reflection characteristics irregular part comprises a convex shaped portion of the surface of the conveyance member.

15. An image formation apparatus comprising:

a conveyance member includes a surface, wherein the conveyance member surface comprise a first reflection characteristics part having a first light reflection characteristics and a second reflection characteristic part having a second light reflection characteristics different from the first light refection characteristic;

a measurement unit configured to perform a detection operation including irradiating the conveyance member with irradiation light and detecting a reflection light;

a controller configured to perform a current detection operation, and perform a next detection operation after a surface of the conveyance member is moved by a distance longer than a length of the second reflection characteristics part in a movement direction of the conveyance member surface; and a correction unit configured to perform a correction for image formation on the basis of detection results of the current detection operation and the next detection operation by the measurement unit, wherein the following formula (I) is satisfied:

[Formula I]

$$\sum_{i=2}^{n} Li < (W2 - W1), \tag{I}$$

where W1 is the reflection characteristics irregular part length, W2 is a circumference length of the conveyance member, Li is a movement amount of the conveyance member from a detection position at which an (i−I)-th detection operation is performed at a detection position at which an i-th detection operation is performed, and n is a total number of the detection operations, and i is a natural number of 2 to n, both inclusive.

16. The image formation apparatus according to claim 15, wherein the second reflection characteristics part has a width in the movement direction of the conveyance member surface and extends in a direction across the movement direction of the conveyance member surface.

17. The image formation apparatus according to claim 16, wherein the second reflection characteristics part extends in a direction substantially orthogonal to the movement direction of the conveyance member surface.

18. The image formation apparatus according to claim 15, wherein the second reflection characteristics part comprises a convex shaped portion of the surface of the conveyance member.

* * * * *